US012059686B2

(12) United States Patent
Geiger

(10) Patent No.: US 12,059,686 B2
(45) Date of Patent: Aug. 13, 2024

(54) SHAFT SHREDDER

(71) Applicant: Kompoferm GmbH, Marienfeld (DE)

(72) Inventor: Walter Geiger, Salzburg (AT)

(73) Assignee: Kompoferm GmbH, Marienfeld (DE)

( * ) Notice: Subject to any disclaimer, the term of this patent is extended or adjusted under 35 U.S.C. 154(b) by 979 days.

(21) Appl. No.: 17/045,593

(22) PCT Filed: May 10, 2019

(86) PCT No.: PCT/EP2019/062002

§ 371 (c)(1),
(2) Date: Oct. 6, 2020

(87) PCT Pub. No.: WO2019/215312

PCT Pub. Date: Nov. 14, 2019

(65) Prior Publication Data

US 2021/0023569 A1 Jan. 28, 2021

(30) Foreign Application Priority Data

May 11, 2018 (EP) .................................... 18171900

(51) Int. Cl.
*B02C 18/24* (2006.01)
*B02C 18/14* (2006.01)
*B02C 18/22* (2006.01)
*B02C 18/26* (2006.01)

(52) U.S. Cl.
CPC ........ *B02C 18/142* (2013.01); *B02C 18/2291* (2013.01); *B02C 18/24* (2013.01); *B02C 18/26* (2013.01); *B02C 2018/147* (2013.01)

(58) Field of Classification Search
CPC ... B02C 18/142; B02C 18/2291; B02C 18/24; B02C 18/14
USPC ............................................ 241/285.2, 285.3
See application file for complete search history.

(56) References Cited

U.S. PATENT DOCUMENTS 2,462,692 A * 2/1949 Vickers ................. B02C 18/142
241/236
4,034,918 A * 7/1977 Culbertson ......... B02C 18/0084
60/403
4,921,176 A * 5/1990 Kunisada ................ B02C 19/22
241/260.1

(Continued)

FOREIGN PATENT DOCUMENTS

DE 3927376 A1 2/1991
EP 1593435 A1 11/2005

(Continued)

OTHER PUBLICATIONS

Wipo, International Search Report (on a related application), Sep. 27, 2019.

*Primary Examiner* — Faye Francis
(74) *Attorney, Agent, or Firm* — Laurence P. Colton; Smith Tempel Blaha LLC

(57) ABSTRACT

A shaft shredder having a machine frame and a shredding unit. The shredding unit has at least one shredding shaft that is mounted therein and is driven by a drive. A material feeding region is formed adjacently to the shredding unit and has a plurality of side walls. At least one of the side walls that is arranged on the end face with respect to the axial direction of the shredding shaft is formed such that it can be moved from a use position into a maintenance position.

4 Claims, 9 Drawing Sheets

(56) References Cited

U.S. PATENT DOCUMENTS

| | | | | |
|---|---|---|---|---|
| 5,273,218 | A | 12/1993 | Burns | |
| 5,580,006 | A * | 12/1996 | Hennenfent | B02C 18/142 241/285.2 |
| 2005/0036925 | A1 | 2/2005 | Butler | |
| 2008/0283647 | A1 | 11/2008 | Sotsky | |
| 2015/0060583 | A1 | 3/2015 | Boehlefeld | |
| 2023/0234070 | A1 * | 7/2023 | Burhorst | B02C 18/0092 241/236 |

FOREIGN PATENT DOCUMENTS

| | | | | |
|---|---|---|---|---|
| EP | 3248687 | A1 | 11/2017 | |
| KR | 20060127942 | A * | 12/2006 | B02C 18/142 |
| WO | 9746321 | A1 | 12/1997 | |

* cited by examiner

SHAFT SHREDDER

CROSS REFERENCE TO RELATED APPLICATIONS

This application is the US National Phase of and claims the benefit of and priority on International Application No. PCT/EP2019/062002 having an international filing date of 10 May 2019, which claims priority on European Patent Application No. 18171900.6 having a filing date of 11 May 2018.

BACKGROUND OF THE INVENTION

Technical Field

The invention relates to a shaft shredder, in particular a two-shaft shredder, comprising a machine frame and a shredding unit, which comprises at least one shredding shaft that is mounted in said unit and driven by means of a drive, a material feeding region being formed adjacently to the shredding unit and comprising a plurality of side walls.

Prior Art

Corresponding shaft shredders are known from EP 3 248 687 A1, for example. The known shaft shredder is a two-shaft shredder and comprises shredding shafts having shredding tools thereon, which surround the shaft in the circumferential direction and are spaced apart in the axial direction. The two shafts are arranged having axes of rotation that extend in parallel with one another such that they mesh by the shredding tools of one shaft plunging into the spaces between the shredding tools of the other shaft.

The known shaft shredder comprises a shredding unit, which defines a shredding region in which the shredding shafts can detect the material that is fed in and is to be shredded. A material feeding region can be spatially distinguished therefrom, which generally adjoins the shredding unit so as to be adjacent to, in particular above, the shredding region of said shredding unit with respect to the direction of gravity when the shafts are arranged horizontally. Such a material feeding region usually comprises a row of side walls—which often converge in the shape of a funnel.

In generic shaft shredders, the problem often arises of objects getting caught in the shredding shafts, for example, or the shredding tools becoming worn. In such cases, maintenance must be carried out, wherein, in the known shaft shredder, it is proposed that inspection flaps are provided on the longitudinal sides of the shredding shafts in the shredding region beneath the material feeding region for this. These can be opened when the machine is stopped and therefore allow access to the shredding region.

Occasionally, a corresponding shredding shaft has to be dismantled. The generic document proposes coupling the shafts to the machine frame by means of an axial coupling. In order to dismantle them, the shafts can be displaced axially, as a result of which the axial couplings of the shredding shafts are decoupled from their drive. Furthermore, an end wall comprising shafts mounted therein can then be removed as a two-shaft assembly.

This procedure is disadvantageous since the shredding shafts are to first be axially displaced and then dismantled. In this case, the shredding region together with the surrounding walls also has to be removed, at least in part. This is associated with a large amount of assembly and disassembly effort.

Furthermore, the problem often arises, particularly in shaft shredders having two shafts, of specific objects to be shredded being too lightweight to be properly detected by the shredding tools of the shafts. These objects then "dance around" on the rotating shafts without being thereby detected and shredded. In stationary shaft shredders having just one shaft, secondary pushing devices are used for this purpose, by means of which the lightweight objects can be pushed into the operating region of the shredding shaft. These secondary pushing devices are usually installed on the end faces of the shaft shredder in the material feeding region in the form of a rocker. In shaft shredders having two shredding shafts, this installation would, however, be associated with a considerable spatial restriction of the material feeding region and therefore of the processing ability of the shaft shredder, and therefore the installation of a secondary pushing device is already eliminated for this reason, especially in mobile shaft shredders having two shredding shafts.

Lastly, depending on the application, shaft shredders exist that have two shredding shafts that function asynchronously, i.e. there is no defined ratio between the speeds of the shredding shafts and their direction of rotation. On the other hand, there are applications in which synchronous operation of the shredding shafts is advantageous. Until now, separate shaft shredders have been required for both applications.

BRIEF SUMMARY OF THE INVENTION

The object of the present invention is therefore to provide a shaft shredder of the type mentioned at the outset, in which the disadvantages illustrated are avoided or reduced by all means.

This object is achieved in particular by a shaft shredder comprising a machine frame and a shredding unit, which comprises at least one shredding shaft that is mounted in said unit and driven by means of a drive, a material feeding region being formed adjacently to the shredding unit and comprising a plurality of side walls, characterized in that at least one of the side walls, in particular at least one side wall arranged on the end face with respect to the axial direction of the shredding shaft, is designed to be moveable, in particular foldable or displaceable, from a use position into a maintenance position.

This object also is achieved in particular by a shaft shredder comprising a machine frame and a shredding unit, which comprises at least one shredding shaft that is mounted in said shredding unit and is driven by means of a drive, a material feeding region being formed adjacently to the shredding unit and comprises a plurality of side walls, the shaft shredder comprising two shredding shafts arranged next to one another, characterized in that said shaft shredder comprises a secondary pushing device, in particular a driven secondary pushing device, which comprises a secondary pushing element that is in particular elongate, in particular cylindrical, and the longitudinal axis of which preferably extends in parallel with the axes of rotation of the shaft shredder.

This object is achieved in particular by a shaft shredder comprising a machine frame and a shredding unit, which comprises at least two shredding shafts that are mounted in said shredding unit and driven by means of a drive, a material feeding region being formed adjacently to the shredding unit, characterized in that the shaft shredder comprises a shaft coupling apparatus, which is designed such that it can switch from a synchronous mode, in which the shredding shafts are moved in a defined speed ratio in opposite directions of rotation, and an asynchronous mode, in which the shredding shafts are moved in any direction of rotation and without a defined speed ratio.

Advantageous embodiments can be found in the dependent claims.

A shaft shredder according to the invention comprises a machine frame and a shredding unit. The shredding unit comprises at least one shredding shaft mounted therein, which is driven by means of a drive. A material feeding region is formed adjacently to the shredding unit and comprises a plurality of side walls. This material feeding region shall be understood in particular to be located outside the detection region of the shredding unit or the shredding shaft. In particular, the shredding region can be arranged above or over the at least one shredding shaft with respect to the direction of gravity.

According to the invention, at least one of the side walls can now be moved, in particular can be folded or displaced, from a use position into a maintenance position. This preferably applies to a plurality of the side walls, in particular all the side walls can be formed in this way. Within the context of the invention, one side wall can firstly be any component that is suitable for laterally delimiting the material feeding region. First of all, it does not matter here whether such a side wall is arranged vertically or extends at an angle to the horizontal, for example. In particular, within the context of the invention, a component that is commonly known as a tipping funnel, can also be a side wall provided that this tipping funnel delimits the material feeding region.

At least one side wall, which is arranged on the end face with respect to the axial direction of the shredding shaft, can preferably be designed such that it can be moved, in particular folded or displaced, into a maintenance position. End-face side walls are those walls that are not arranged in parallel with the longitudinal sides of a shredding shaft, but transversely to the longitudinal extension of the shredding shaft, in particular in the region of its end portions and in particular substantially above the shredding shaft.

As a result, the coupling regions, which are to be understood as those regions in which the shredding shaft is coupled to a machine-side coupling portion, are free. In the maintenance position, bearing and/or coupling regions of the at least one shredding shaft are therefore accessible. In this way, it is possible to dismantle the shredding shaft from the machine frame in the maintenance position and preferably lift it upwards out of the shredding region, i.e. in particular perpendicularly to the direction of gravity, without the complex process of having to remove parts of the shredding region or partially or completely dismantle walls.

In this case, it is particularly advantageous if the at least one shredding shaft can be disassembled from the shredding housing in the predominantly perpendicular direction as a result of a releasable interlocking coupling, in particular a screwable flange coupling, on each end of the shredding shaft, and for the bearings of the shafts to remain on or in the shredding housing. Of course, other types of coupling are also conceivable.

In order to improve material feeding, a wall of the material feeding region can be formed as a tipping funnel, in particular covering the drive of the shredding shaft (at least in the use position), at least in part. According to a preferred embodiment of the present invention, a wall, in particular the wall formed as a tipping funnel, can be moved, in particular displaced, in particular at least substantially horizontally, such that the space for the releasable interlocking coupling is thereby freed for maintenance purposes. Alternatively or in addition thereto, one of the side walls of the material feeding region can be moved, in particular pivoted or displaced substantially horizontally, such that the space for the releasable interlocking coupling is freed for maintenance purposes. All of these measures ensure that none of the side walls present have to be dismantled in order to carry out maintenance work or to remove a shredding shaft.

According to another preferred embodiment of the present invention, at least one secondary shredding tool, in particular a breaker bar or strainer basket, can be arranged—in particular with respect to the direction of gravity—under or beneath the at least one shredding shaft. The secondary shredding tool can preferably be substantially raised or lowered in the vertical direction—in particular with respect to the direction of gravity. Raising or lowering is, on the one hand, advantageous in that the machine can thereby still be adapted to the material to be shredded, if necessary. On the other hand, it is possible to move the secondary shredding tool away from the shredding shafts for maintenance purposes. Therefore, according to another preferred embodiment, the secondary shredding tool can in particular be guided out of the shaft shredder after being lowered. After lowering the secondary shredding tool, said tool can preferably be moved out of the machine frame, for example laterally in the form of a drawer. Of course, the apparatus can also be designed such that it provides this on the end face of the shaft shredder. The shaft shredder preferably comprises inspection flaps correspondingly placed beneath or below the shredding shafts to bring out the secondary shredding tool, which render the secondary shredding tool accessible.

The shaft shredder according to the invention is preferably a two-shaft shredder, which comprises two shredding shafts that are adjacent, in particular having axes of rotation arranged in parallel with one another. Within the context of the invention, “adjacent” does not necessarily mean a horizontal orientation and a parallel orientation of the two shredding shafts. “Adjacent” merely means that the two shredding shafts are arranged spatially near to one another. Therefore, a V-shaped configuration of the two shredding tools can be meant thereby as well as an arrangement in which the two shafts are arranged vertically offset to one another in the style of a step when viewed in the direction of gravity. In this context, all relative configurations of the two shredding shafts can be understood as being adjacent. At all events, an adjacent configuration is provided when the shredding tools arranged on the shafts mesh with one another, i.e. the shredding tools that are arranged on the circumference of the particular shredding shaft engage, at least in part, in the spaces between the shredding tools of the other shredding shaft in each case.

According to a specific embodiment of the present invention, a shaft shredder comprising a machine frame and a shredding unit is provided, which comprises two shredding shafts that are adjacent, wherein the shredding shafts are driven by means of at least one drive and a material feeding region is formed adjacently to the shredding unit and comprises a plurality of side walls, wherein the shaft shredder, which is furthermore in particular designed as described above, comprises at least one secondary pushing device, in particular a driven secondary pushing device. In this case, the secondary pushing device comprises an elongate, in particular cylindrical, secondary pushing element, for example, the longitudinal axis of which preferably extends in parallel with the axes of rotation of the shredding shafts. Of course, the secondary pushing device can comprise a plurality of secondary pushing elements arranged along the shredding shafts, wherein these can comprise spherical secondary pushing elements instead of an elongate secondary pushing element, for example.

By means of this secondary pushing device, in particular light-weight, bulky or voluminous parts in the material to be shredded that are otherwise not detected by the two shredding shafts, but rather are thrown back and forth on the shafts, can be pushed into the operating region of the tools of the shredding shafts.

According to a preferred embodiment of the present invention, the secondary pushing device can be moveable, in particular pivotable, from a use state in the region of the shredding shafts, in particular in the region between and/or above the shredding shafts, into a non-use state for this purpose. The use state is the state in which the secondary pushing device actively participates in the shredding process. For example, this can happen in such a way that it merely pushes the material to be shredded by means of gravity. The secondary pushing device is preferably driven, i.e. in addition to the force of gravity, it actively pushes material against the shredding shafts. This can happen in an alternating fashion such that a back and forth movement of the secondary pushing device is carried out towards and away from the shafts. In contrast, the non-use state of the secondary pushing device refers to the state in which new material enters the material feeding region, for example, and the secondary pushing device is not actuated.

According to a preferred embodiment, the secondary pushing device is attached to one of the side walls, in particular pivotally. One of these side walls is preferably a side wall provided on a longitudinal side of a shredding shaft. The secondary pushing device can be pivoted out of the non-use position and into the use position or moved into the use position, for example by means of a drive, in particular by one or a plurality of hydraulic cylinders. In this case, the secondary pushing device is preferably attached to a pivot lever that is pivotally mounted on the corresponding side wall at the end that is opposite the secondary pushing element. In this case, the pivot lever is preferably mounted in the side wall such that there is no opening in the side wall in each pivot state of the pivot lever. This can be achieved, for example, by a circular disc or at least a circular disc segment being rotatably mounted in the side wall such that the axis of rotation is parallel to the side wall, wherein the pivot lever is attached to this circular disc segment or this circular disc. In this case, the surface, in particular the circumferential surface, of the circular disc or the circular disc segment, which extends through a bearing opening in the side wall, closes the bearing opening in each pivot state.

According to another preferred embodiment of the present invention, a shaft shredder comprising a machine frame and a shredding unit is provided, which unit comprises at least two shredding shafts mounted therein that are driven by means of a drive, wherein a material feeding region is formed adjacently to the shredding unit. This two-shaft shredder can be designed as described above. According to the invention, the shaft shredder comprises a shaft coupling apparatus, which is designed such that it can switch from a synchronous mode, in which the shredding shafts are moved in a defined speed ratio in opposite directions of rotation, and an asynchronous mode, in which the shredding shafts are moved in any direction of rotation and without a defined speed ratio. In this way, the shaft shredder can be adapted to requirements that emerge with regard to the shredding process.

According to an advantageous embodiment, the shaft coupling apparatus comprises a displaceable or pivotable pinion in order to bring about the switch from the synchronous mode to the asynchronous mode. Such a pinion can easily be displaced from a synchronous position, in which the two shafts are coupled to one another, into an asynchronous position by any drive or even manually.

For all the embodiments presented here, whenever drives are mentioned, of course any type of drives can be meant.

The drive unit for the shredding shafts can preferably be diesel-hydraulic or electro-hydraulic drive units.

According to another embodiment of the present invention, the shaft shredder according to the invention comprises a transmission device that is or can be coupled to the shredding shafts, is arranged on the drive side or on the side of the shredding shafts that is opposite the drive side, and in particular comprises the shaft coupling apparatus. Transmission devices can be understood such that any type of coupling of a shaft to the drive is to be meant thereby. Meshing gearwheels can be provided as well as belt drives or chain drives, for example. Every shredding shaft preferably comprises a separate transmission.

Furthermore, in the shaft shredder according to the invention, an electric controller can be provided for controlling and monitoring the mechanical, electric and hydraulic processes and parameters of the machine.

The side walls can of course be moved by hand; it is of course also conceivable for one or a plurality of side walls to be hydraulically, electrically or mechanically moveable. This can then be brought about by means of the controller, for example.

The side walls provided on the longitudinal sides of the shredding shaft are preferably designed such that they can be tightly positioned on the outer edge of the housing of the shredding unit. As a result, direct accessibility to the shredding tools on the shredding shafts and the mating ridges is achieved. The mating ridges are preferably attached beneath the side walls on the longitudinal sides in the shredding unit.

BRIEF DESCRIPTION OF THE DRAWINGS

The invention will be explained in more detail in the following on the basis of FIGS. 1-9, in which.

DETAILED DESCRIPTION OF PREFERRED EMBODIMENTS

Figure 1:
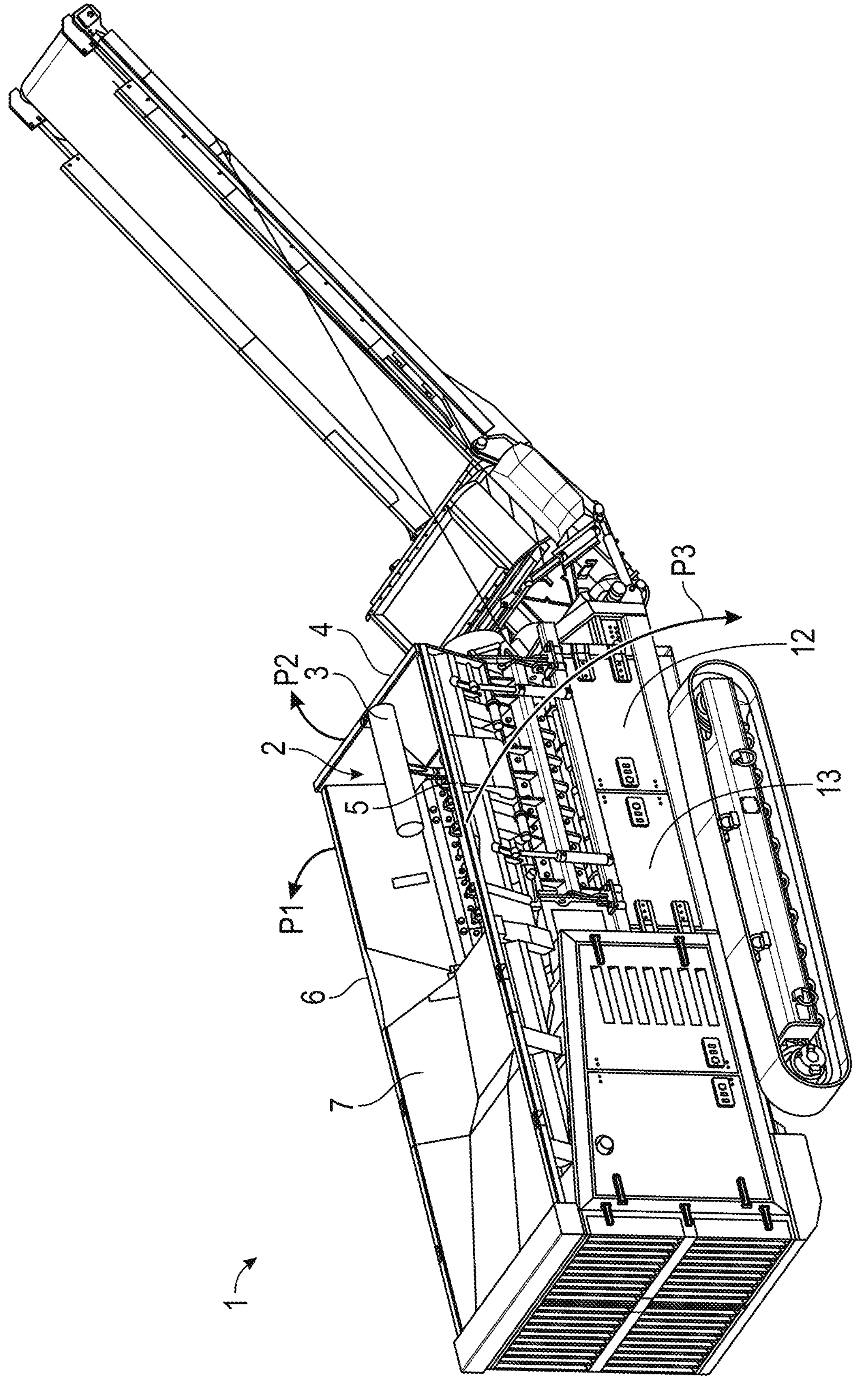
FIG. 1 is a perspective view of a shaft shredder according to the invention in the loading position.

FIG. 1 shows a movable shaft shredder 1 in the loading position. The material feeding region that is arranged above the shredding unit 2 and is formed inside the side walls 4-7 thereof can be seen in this figure. The inspection flaps 12, 13 are arranged beneath the side wall 5 and beneath the shredding unit 2 comprising the shredding shafts 8, 9 (not visible here). The side walls 4, 5, 6 are designed such that they can be folded back towards the outside for maintenance purposes P1, P2, P3. The secondary pushing device 3, which will be discussed in more detail below, is arranged on the side wall 5.

The material to be shredded is placed in the material feeding region, shredded by the shredding unit 2 and collected beneath it. The material to be shredded is transported from here to the conveyor belt shown on the right-hand side, and transported away by this.

Figure 2:
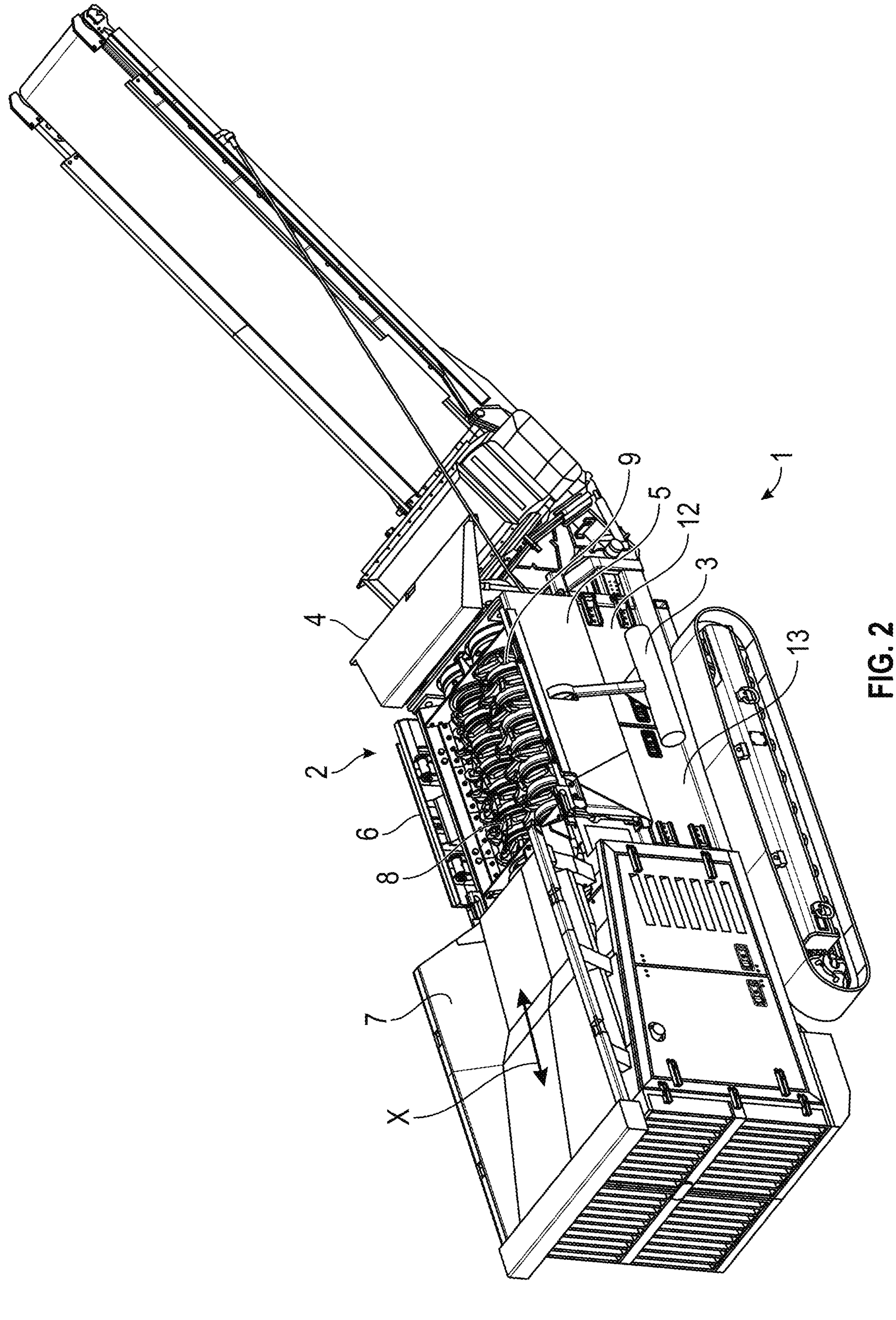
FIG. 2 shows the shaft shredder in preparation for maintenance.
Figure 3:
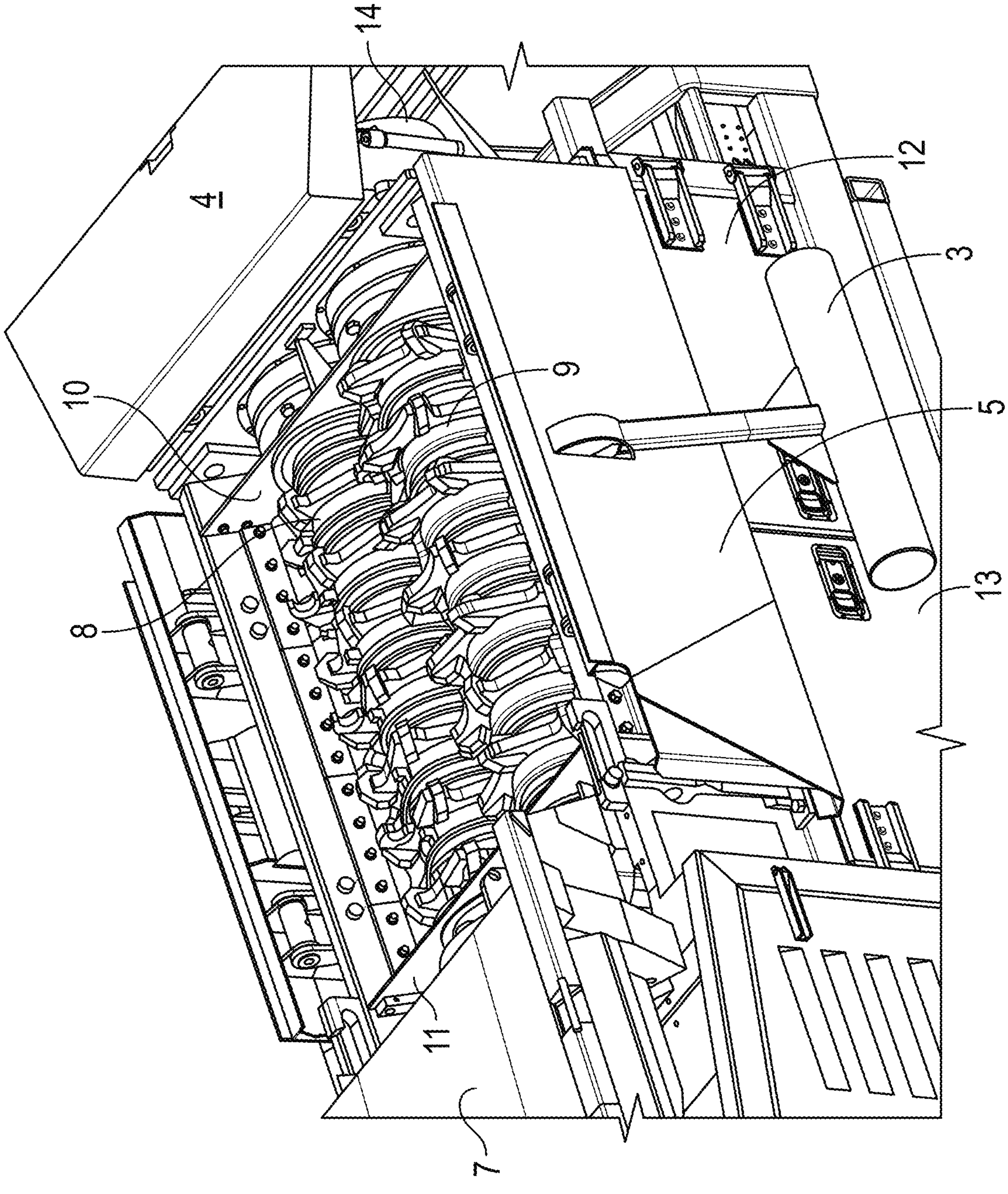
FIG. 3 is a detailed view of FIG. 2.

FIG. 2 shows the shaft shredder 1 in preparation for maintenance. The side walls 4, 5, 6 are folded down towards the outside and provide a view of the two shredding shafts 8, 9. The side wall 7, which can be designed as a material chute or tipping funnel, can be displaced from the shredding unit 2 across the machine housing in the X direction. FIG. 3 is an enlarged view of the shredding unit 2 in FIG. 2. The shredding shafts 8, 9, which are arranged having the longitudinal axes parallel to one another here, for example, here, are visible between the side walls 4, 5, 6, 7 that have been folded down or pushed away. The shredding region is delimited in the axial direction by shields 10, 11. The shield 10 is intended to prevent the material to be shredded from reaching the region of the couplings facing the shaft coupling apparatus 14.

Figure 4:
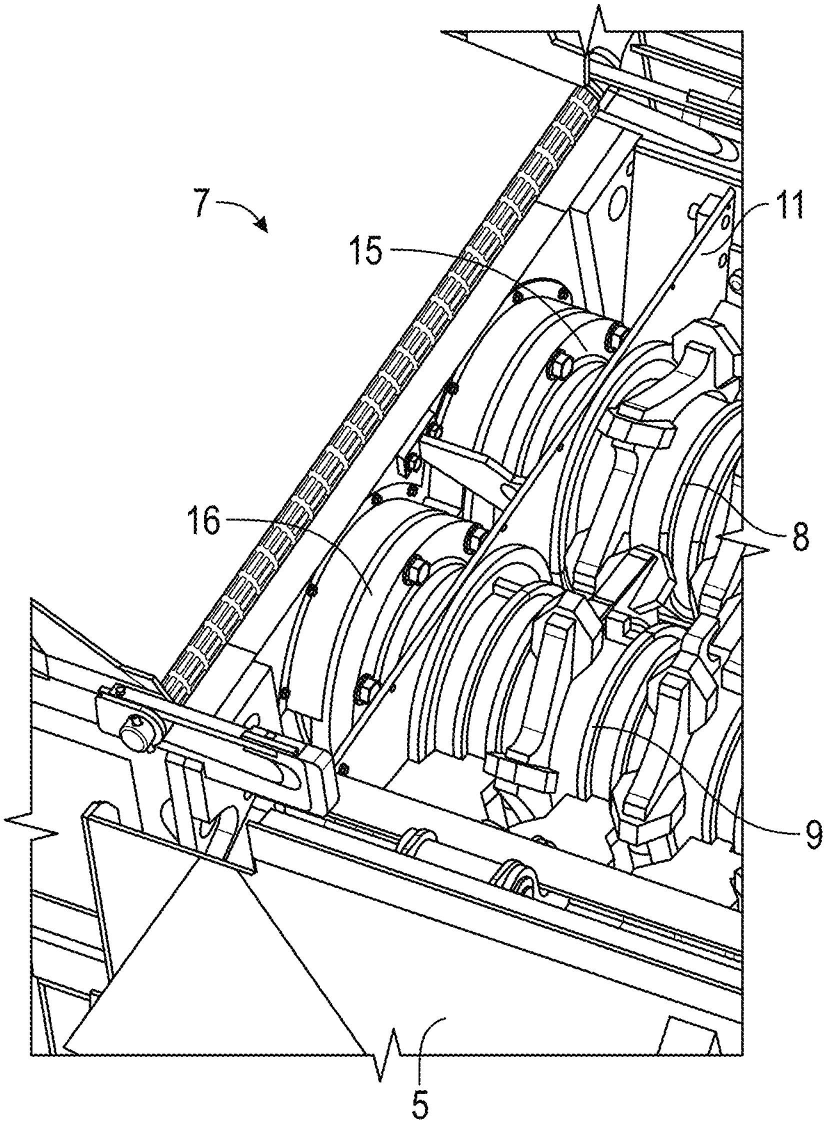
FIG. 4 shows a coupling region of the drive and shredding shafts.
Figure 5:
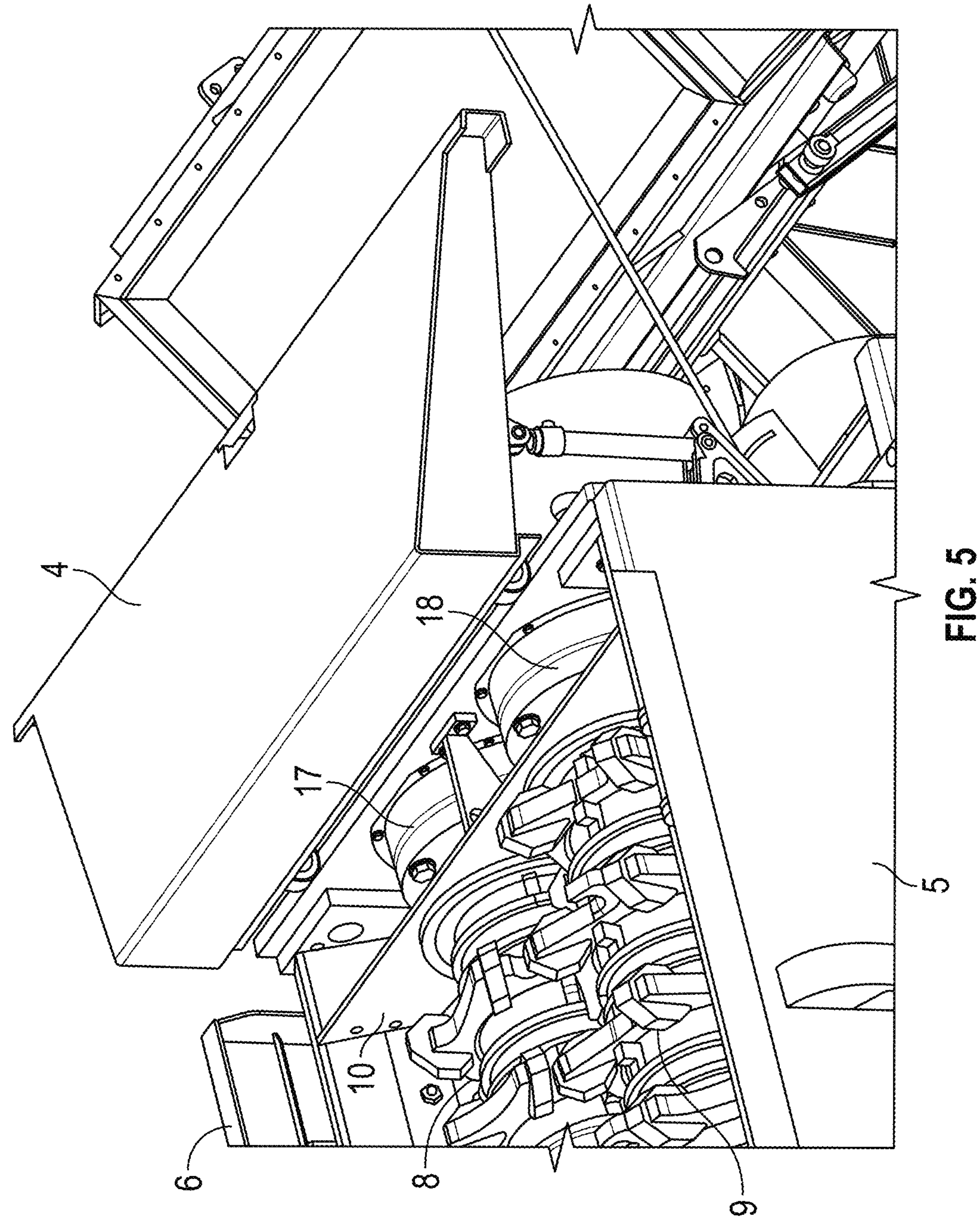
FIG. 5 shows the coupling region of the shredding shafts and shaft coupling apparatus.

Likewise, the shield 11 is intended to prevent material to be shredded from entering the flange region facing the drive. This region is shown in FIG. 4. The shredding shafts 8, 9 are arranged on the drive (not shown) by means of couplings 15, 16, in particular flange couplings. The flange couplings 15, 16 are shielded by the shield 11 from the shredding region 2 of the shredding shafts 8, 9 such that no material to be shredded can reach the flange couplings 15, 16. FIG. 5 shows the corresponding couplings 17, 18, in particular flange couplings, on the side of the shaft coupling device 14, where the shield 10 prevents material to be shredded from getting into the region of the flange couplings 17, 18.

The flange couplings 15, 16, 17, 18 can be released in order to remove the shredding shafts 8, 9 and these can then be removed in the radial direction relative to the axis of rotation, in particular the vertical direction, immediately after releasing the screw connection. Therefore, the removal of the shredding shafts 8, 9 can be accelerated without part of the drive or the bearing of the shredding shafts 8, 9 first having to be disassembled for this purpose.

Figure 6:
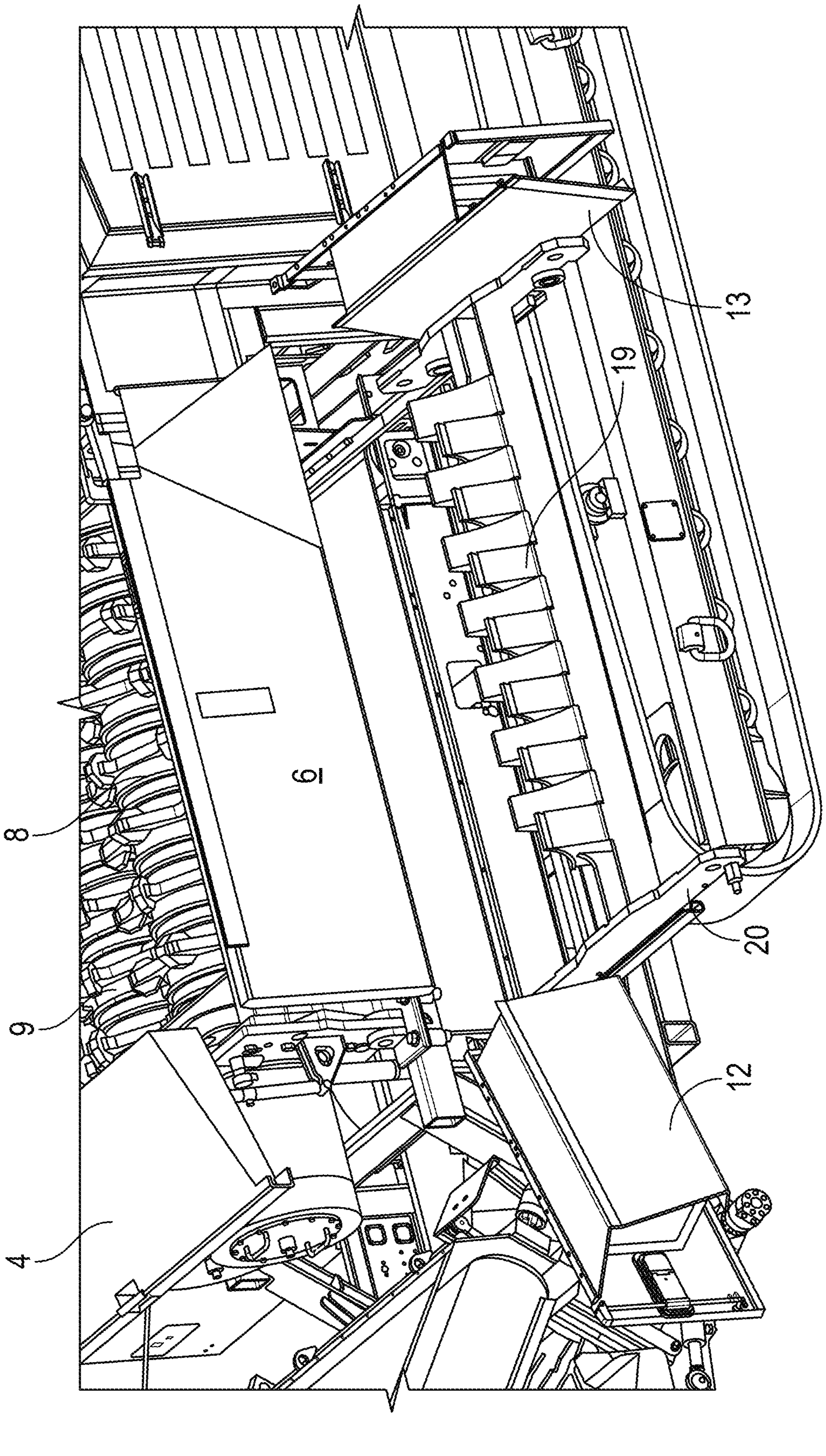
FIG. 6 is a detailed view with the inspection flaps open and the secondary shredding tool pulled out.
Figure 7:
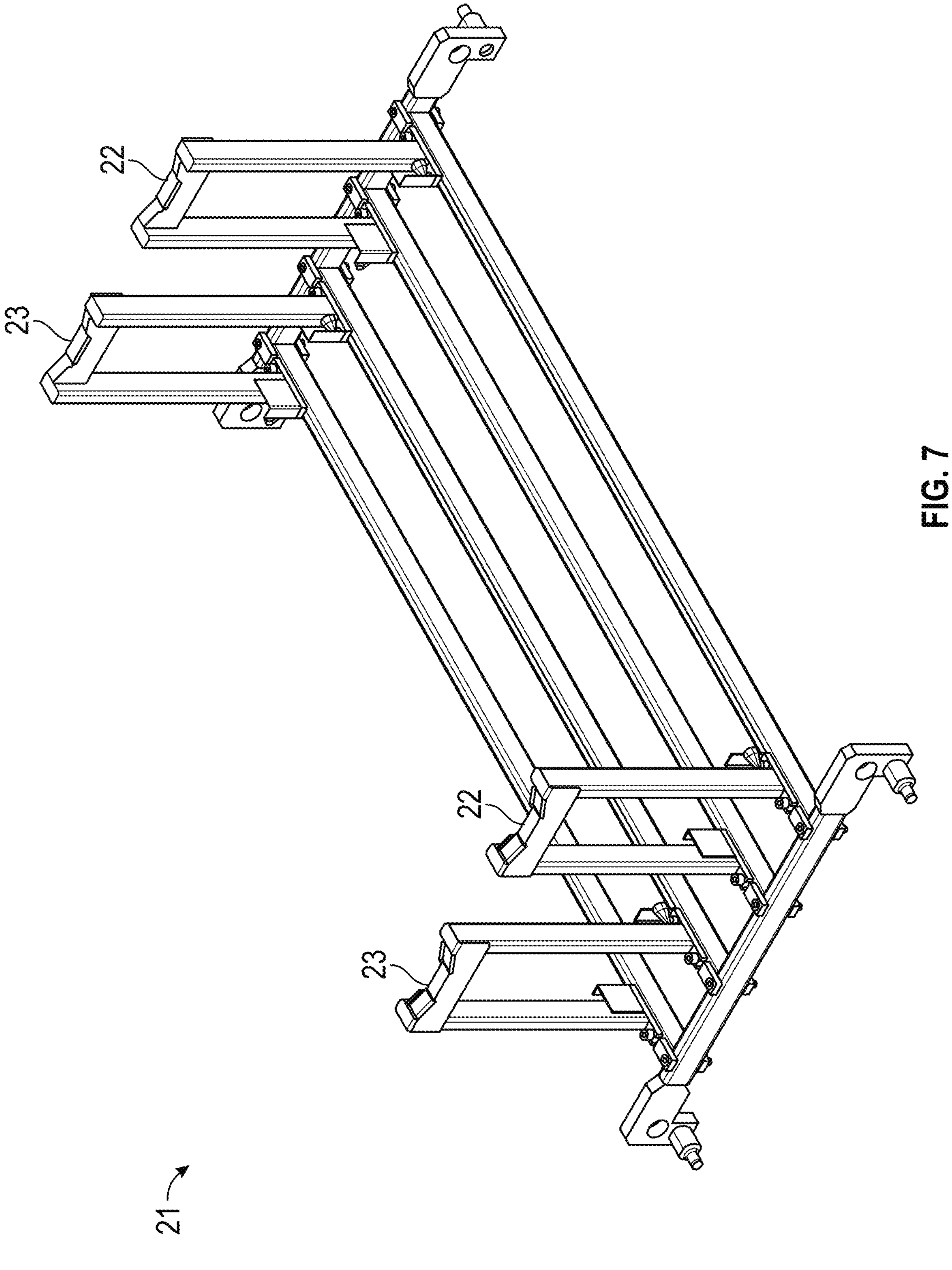
FIG. 7 shows a maintenance rack for receiving shredding shafts.

FIG. 6 shows part of the shredding unit 2 when the inspection flaps 12, 13 are open. In this figure, the pulled-out portion 20 with the secondary shredding tool 19 arranged thereon, which tool is arranged beneath and between the shredding shafts 8, 9 in the operating state, is lowered and pulled out. In this embodiment, the secondary shredding tool 19 is a breaker bar; however, a different secondary shredding tool can also be provided, such as a strainer basket. In the embodiment shown, the pulled-out portion 20 comprising the secondary shredding tool 19 is constructed such that it can be easily lifted out of the guides. The maintenance rack 21 shown in FIG. 7 can now be placed on these guides. Two pairs of rests 22, 23 are arranged on the maintenance rack.

Figure 8:
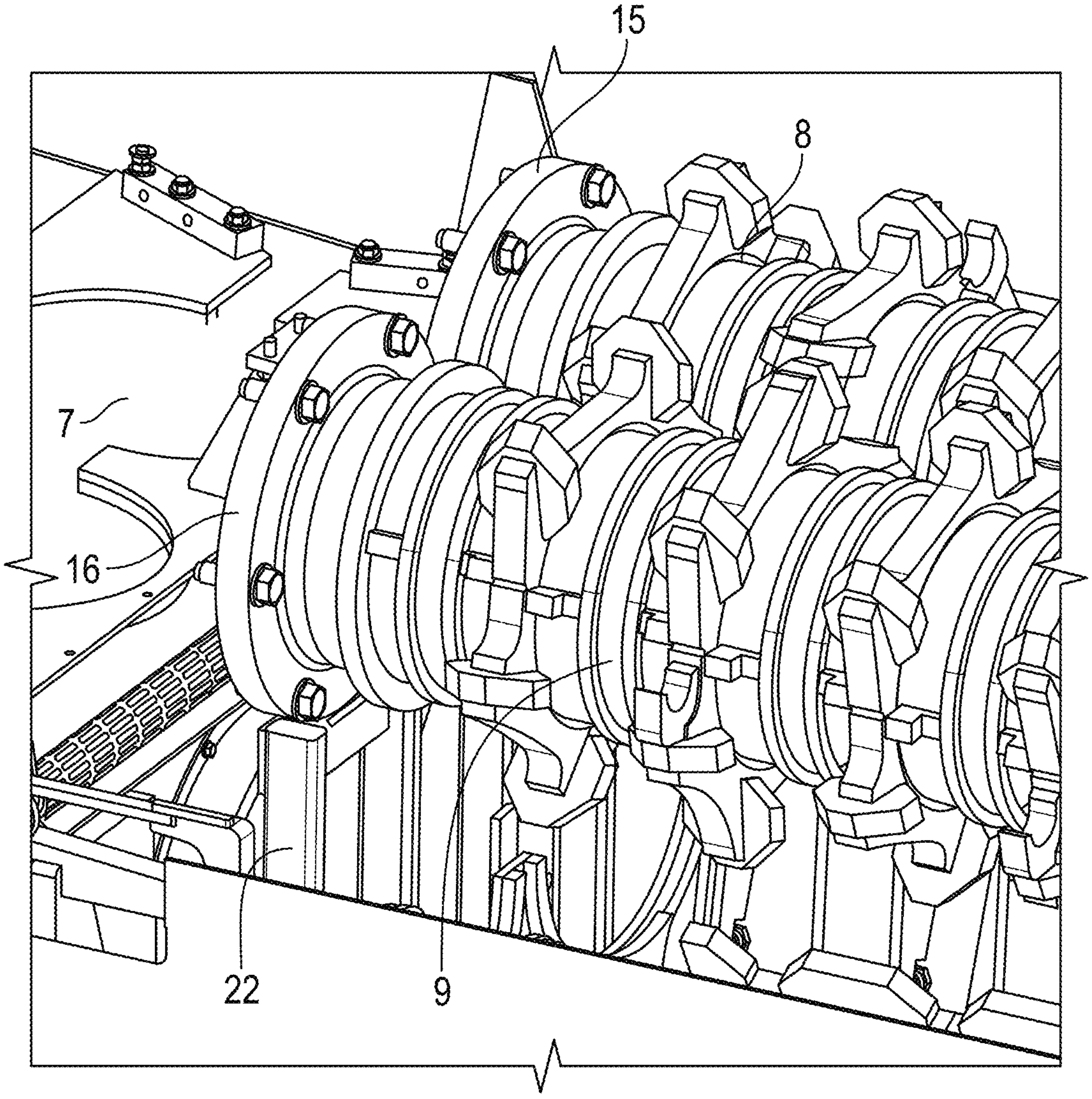
FIG. 8 is a cut-out of the shredding shafts arranged on the maintenance rack.

For maintenance purposes, after releasing the flange couplings 15, 16, 17, 18, the shredding shafts 8, 9 can be raised. The maintenance rack 21 can be inserted into the shaft shredder 1 and be positioned with the rests 22, 23 beneath the shredding shafts 8, 9. The maintenance rack 21 is then raised and the shredding shafts rest on the rests 22, 23 and are raised together with the maintenance rack 21. The shredding shafts 8, 9 can therefore—as shown in FIG. 8—be raised out of the shredding unit 2 and maintained. The shredding shafts 8, 9 are deposited above the coupling position on the maintenance rack 21. In the cut-out shown, the end of the shredding shaft 9 comprising the flange coupling 16 rests on a rest 22, just as the shredding shaft 8 comprising the flange coupling 15 also rests on the rests 23 (not shown). In the raised position, the shredding shafts 8, 9 are easily accessible.

By means of such a shaft shredder 1, maintenance of the shredding unit 2 can be simplified and simultaneously shortened, reducing maintenance costs.

Figure 9:
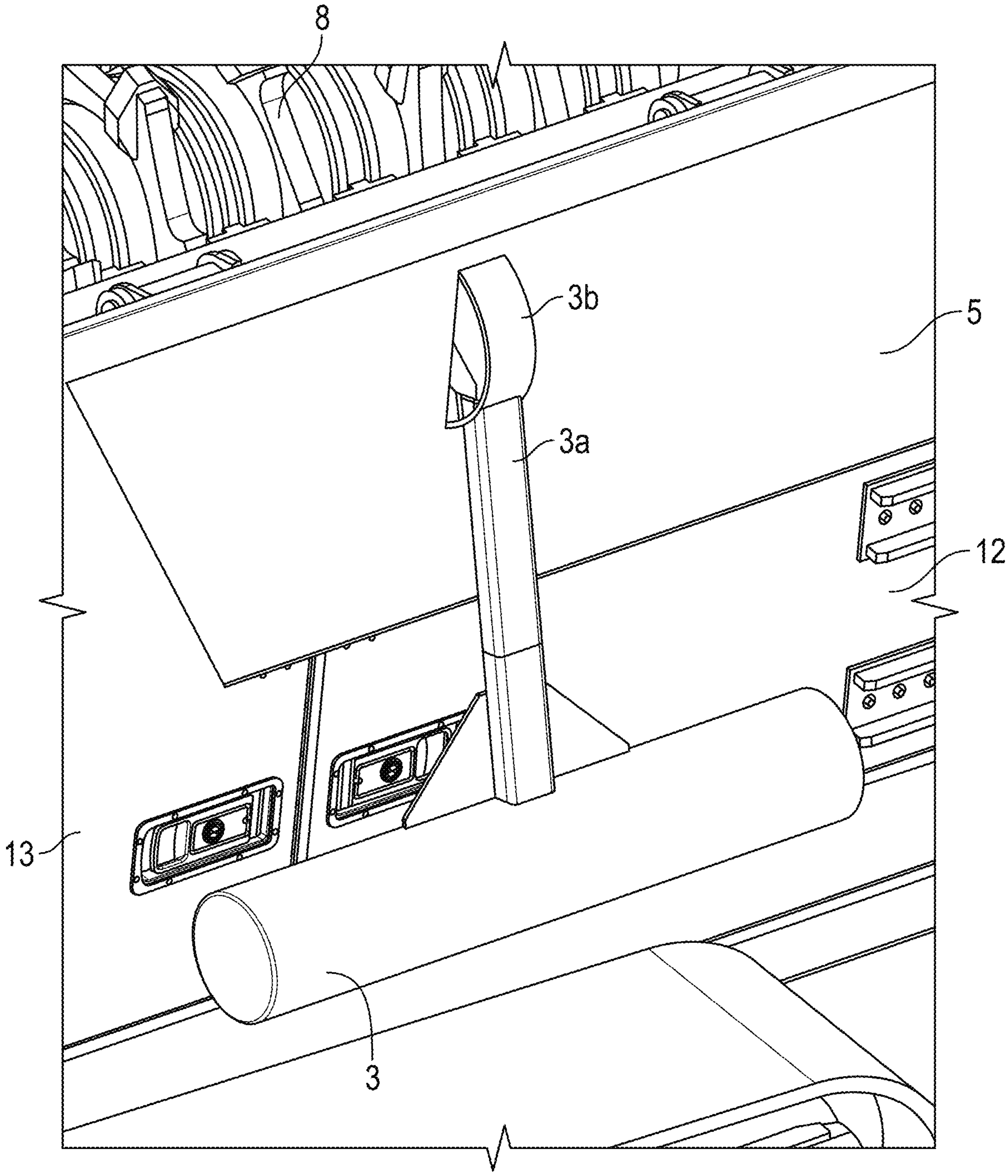
FIG. 9 shows the secondary pushing device in the non-use position, while the side wall is in the maintenance position.

FIG. 9 shows an embodiment of an additional detail according to the invention of the shaft shredder 1, a secondary pushing device 3. The secondary pushing device 3 is arranged on one of the side walls, on the side wall 5 in the example shown here. In the figure, the side wall 5 is shown in the maintenance position, it is folded outwards, as a result of which the inside of the side wall 5 faces outwards and the shredding shaft 8 is more accessible. The secondary pushing device 3 is arranged on the inner wall of the side wall 5. In the example shown, the active part of the secondary pushing device 3 is an elongate cylindrical body, the cylindrical axis of which is oriented in parallel, or at least approximately in parallel, with the axes of the shredding shafts 8, 9. Of course, the secondary pushing device can also be a different shape. A plurality of secondary pushing elements can also be provided, which do not have to be elongate. The active part of the secondary pushing device 3 is fastened to a secondary pushing lever 3*a*. The secondary pushing lever 3*a* is in turn pivotally arranged on the side wall 5 by means of a pivoting element 3*b*.

In the use state, in which the side walls 4, 5, 6, 7 are folded upwards as shown in FIG. 1, on the one hand the secondary pushing device 3 can be pivoted upwards in order to allow for loading, or, on the other hand, the active part of the secondary pushing device 3 can be positioned in a position above and between the shredding shafts 8, 9 by the pivoting element 3*b*, in order to thereby push material to be shredded towards the shredding shafts 8, 9. For this purpose, the secondary pushing lever 3*a* can be moved back and forth, which leads to a secondary filling effect of the secondary pushing device 3. This filling movement of the secondary pushing lever 3*a* is preferably hydraulically driven, since such drives are robust and can transfer large forces. However, it is also conceivable for the drive to be electromechanical, magnetomechanical, pneumatic or a different type of drive.

In order to protect the mechanics of the secondary pushing device 3 from dirt and therefore damage, the pivoting element 3*b* is formed in particular as a circular disc or circular segment disc here. In this case, the region of the pivoting element 3*b*, which protrudes out of the side wall 5 and into the material feeding region, is covered both at the end faces and on the cylindrical surface so that no material to be shredded can adversely affect the function of the pivoting element 3*b*.

The invention claimed is:

1. A shaft shredder (1) comprising a machine frame and a shredding unit (2), which comprises at least two shredding shafts (8, 9) that are mounted in said shredding unit and driven by means of a drive, a material feeding region being formed adjacently to the shredding unit (2), wherein the shaft shredder comprises a shaft coupling apparatus (14), which is structured for switching between a synchronous mode, in which the at least two shredding shafts (8, 9) are moved in a defined speed ratio in opposite directions of rotation, and an asynchronous mode, in which the at least two shredding shafts (8, 9) are moved in any direction of rotation and without a defined speed ratio.

2. The shaft shredder (1) according to claim 1, wherein the shaft coupling apparatus comprises a displaceable or pivotable pinion for switching from the synchronous mode to the asynchronous mode.

3. The shaft shredder according to claim 1, wherein said shaft shredder further comprises a transmission device, which is couplable to the shredding shafts (8, 9), is arranged on a drive side or on a side of the shredding shafts (8, 9) that is opposite the drive side.

4. The shaft shredder according to claim 3, wherein said transmission device comprises the shaft coupling apparatus.

* * * * *